United States Patent [19]
Okazaki et al.

[11] Patent Number: 5,666,555
[45] Date of Patent: Sep. 9, 1997

[54] AUDIO OUTPUT METHOD AND APPARATUS IN MULTI-WINDOW SYSTEM

[75] Inventors: Hiroshi Okazaki; Tomoaki Kawai, both of Yokohama, Japan

[73] Assignee: Canon Kabushiki Kaisha, Tokyo, Japan

[21] Appl. No.: 963,736

[22] Filed: Oct. 20, 1992

[30] Foreign Application Priority Data

Oct. 22, 1991 [JP] Japan ................... 3-273773

[51] Int. Cl.⁶ .............................................. G06F 3/14
[52] U.S. Cl. ............................................... 395/807
[58] Field of Search ................................... 395/154, 156, 395/157, 152, 153, 159

[56] References Cited

U.S. PATENT DOCUMENTS

| | | | |
|---|---|---|---|
| 4,819,189 | 4/1989 | Kikuchi et al. | 364/521 |
| 4,845,564 | 7/1989 | Hakamada et al. | 358/183 |
| 5,065,345 | 11/1991 | Knowles et al. | 395/154 |
| 5,109,482 | 4/1992 | Bohrman | 395/154 |
| 5,245,322 | 9/1993 | Dinwiddie, Jr. et al. | 395/154 X |
| 5,297,249 | 3/1994 | Bernstein et al. | 395/156 |
| 5,313,408 | 5/1994 | Goto | 395/154 X |
| 5,317,732 | 5/1994 | Gerlach, Jr. et al. | 395/154 X |
| 5,434,590 | 7/1995 | Dinwiddie, Jr. et al. | 395/154 X |

FOREIGN PATENT DOCUMENTS

| | | |
|---|---|---|
| B1600588 | 1/1989 | Australia . |
| 2162714 | 2/1986 | United Kingdom . |
| 2222344 | 2/1990 | United Kingdom . |
| 2232552 | 12/1990 | United Kingdom . |
| 2262201 | 6/1993 | United Kingdom . |

OTHER PUBLICATIONS

Microsoft, "Microsoft Windows", 1990, p. XXV, 22, 440.

Sharp, "Using Animator", 1990, pp. 212–221, 314.

*Primary Examiner*—Almis R. Jankus
*Assistant Examiner*—Cliff N. Vo
*Attorney, Agent, or Firm*—Fitzpatrick, Cella, Harper & Scinto

[57] ABSTRACT

An audio output apparatus obtains image signals of moving images to be displayed in each window of a display and corresponding audio signals from a plurality of connected external reproduction apparatuses. The obtained image signal is screen-synthesized, and moving pictures are displayed in each window by a multi-window system. When one of the moving pictures is designated by a pointing device out of the plurality of moving pictures which are displayed in the windows, the audio signal corresponding to the designated moving picture is selected from the plurality of audio signals which are obtained from the plurality of external reproduction apparatuses. Only the sound corresponding to the designated moving image can be output by designating a desired image out of the plurality of moving picture display windows. As a result, a user can selectively listen to the sound corresponding to the desired moving picture.

14 Claims, 4 Drawing Sheets

| WINDOW POSITION INFORMATION | IMAGE SUPPLIER | AUDIO SELECTOR |
|---|---|---|
| AREA A | IMAGE REPRODUCTION APPARATUS 1 | CHANNEL 1 |
| AREA B | IMAGE REPRODUCTION APPARATUS 2 | CHANNEL 2 |
| AREA C | IMAGE REPRODUCTION APPARATUS 3 | CHANNEL 3 |

FIG. 2

| WINDOW POSITION INFORMATION | IMAGE DATA INFORMATION | SOUND-DATA INFORMATION |
|---|---|---|
| AREA A | IMAGE DATA 1 | SOUND DATA 1 |
| AREA B | IMAGE DATA 2 | SOUND DATA 2 |
| AREA C | IMAGE DATA 3 | SOUND DATA 3 |

FIG. 5

AUDIO OUTPUT METHOD AND APPARATUS IN MULTI-WINDOW SYSTEM

BACKGROUND OF THE INVENTION

The present invention relates to an audio output method and apparatus and, more particularly, to an audio output method and apparatus in a multi-window system capable of selectively outputting sound corresponding to a desired moving picture which is selected from moving pictures displayed by a multi-window system.

Conventionally, in a case where a moving picture is displayed on a bit map display of a computer, a display system of the computer generally obtains an image output from an external image reproduction apparatus such as a video tape recorder (hereinafter referred to as a "VTR") or laser disk player (hereinafter referred to as an "LD player"). The image output is then displayed on the bit map display. In a case where audio output is required, an audio signal received from the image reproduction apparatus is directly reproduced by a speaker.

In the prior art above, in the case where a plurality of moving pictures are displayed on the bit map display by the multi-window system, an image signal for each window can be obtained by simultaneously reproducing the plurality of moving pictures by the plurality of image reproduction apparatuses. Furthermore, in the case where an audio output is required when a plurality of moving pictures are being displayed by the multi-window system, a user cannot selectively listen to the sound corresponding to an image of interest due to the following problems:

1) Since a plurality of sounds are simultaneously reproduced by each image reproduction apparatus, the output is almost unintelligible;
2) All sounds are not output to be silent; and
3) The sound corresponding to only one moving picture is fixedly output.

SUMMARY OF THE INVENTION

Accordingly, it is an object of the present invention to provide an audio output apparatus in a multi-window system capable of eliminating the aforementioned drawbacks of the prior art described above, and of selectively outputting the necessary sound out of a plurality of moving-picture display windows by outputting only the sound corresponding to a designated moving picture.

According to the present invention, the foregoing object is attained by an audio output apparatus in a multi-window system comprising: input means for inputting a plurality of image information and audio information corresponding to each image information; display means for displaying each image information which is input by the input means on a corresponding window; designation means for designating one of windows; and audio output means for selecting audio information corresponding to the image information of the window which is designated by the designation means out of the plurality of audio information which are input by the input means and outputting the selected audio information.

According to the present invention, the foregoing object is further attained by an audio output method in a multi-window system comprising the steps of: inputting a plurality of image information and audio information corresponding to each image information; displaying each image information which is input by the input step on a corresponding window; designation means for designating one of windows; and selecting audio information corresponding to the image information of the window which is designated by the designation step out of the plurality of audio information which are input by the input step.

According to the construction above, an audio output corresponding to a designated moving picture can be obtained by designating one of the plurality of moving pictures which are displayed by the multi-window system.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a window information table showing the relationship between a position of a window, an image information supplier, and a channel of the audio selector.

FIG. 5 is a window information table showing the relationship between a position of a window, an image information supplier, and an audio information supplier in the second embodiment.

DESCRIPTION OF THE PREFERRED EMBODIMENTS

Preferred embodiments of the present invention will now be described in detail in accordance with the accompanying drawings.

THE FIRST EMBODIMENT

Figure 1:
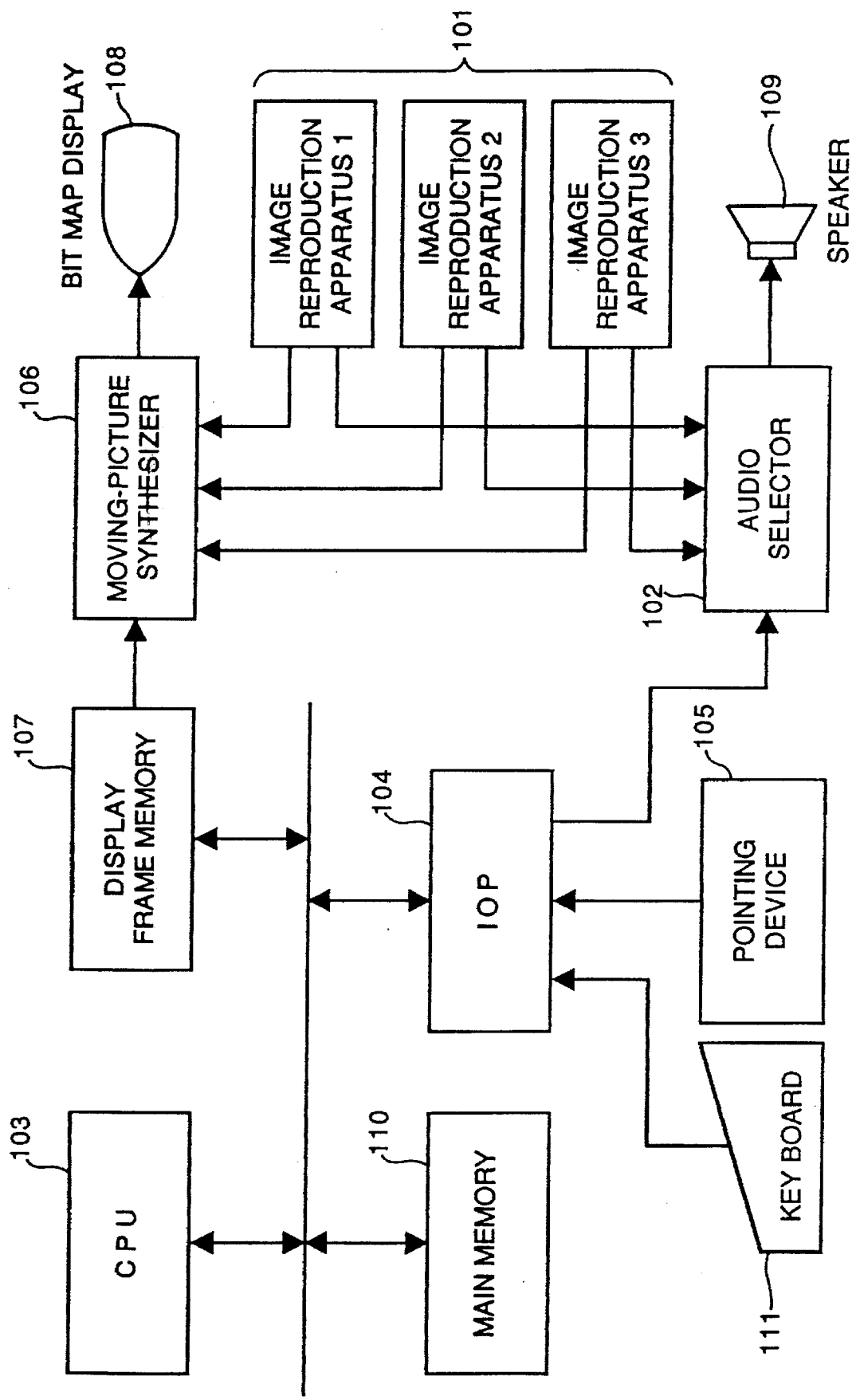
FIG. 1 is a block diagram illustrating a construction for controlling the multi-window system according to the first embodiment.

FIG. 1 is a block diagram illustrating a construction for controlling the multi-window system according to the first embodiment. In the diagram, numeral 101 denotes a plurality of external image reproduction apparatuses which simultaneously reproduce a plurality of moving images. In the present embodiment, the apparatus such as an LD player or a VTR is used as an image reproduction apparatus. Each of image outputs from the image reproduction apparatuses 101 is input to a moving-picture synthesizer 106 and each audio output corresponding to each image output is input to an audio selector 102. Numeral 103 denotes a central processing unit (hereinafter referred to as a "CPU") which controls the entire apparatus in accordance with a control program stored in a main memory 110. Numeral 104 is an input/output processor (hereinafter referred to as an "IOP") which connects a key board 111, a pointing device 105, and the audio selector 102 with the CPU 103.

The moving-picture synthesizer 106 is an analog device which synthesizes a plurality of moving pictures reproduced by the external image reproduction apparatuses 101 and an image formed on a display frame memory 107, generates an image signal, and outputs the image signal to a bit map display 108. The bit map display 108 displays moving pictures on the multi-window by displaying the image signal from the moving-picture synthesizer 106. The audio selector 102 selects one of a plurality of audio signals which are input from the plurality of the external image reproduction apparatuses 101 and outputs the selected audio signal to a speaker 109. The audio selector 102 connects to the CPU 103 through the IOP 104. Selection of an audio signal by the audio selector 102 is controlled by a control signal from the CPU 103.

The CPU 103 detects that a pointer (a display cursor) operated by the pointing device 105 is on a moving-picture display window on the bit map display 108 and controls the audio selector 102 so that the audio signal corresponding to the picture in this window is selected. The pointer is formed as an image in the display frame memory 107 by the CPU 103.

The main memory 110 stores various controlling programs and data in order for the CPU 103 to execute various processings. The audio selection program which is executed by the CPU 103 (the flowchart of FIG. 3 which will be described later) is also stored in the main memory 110. Furthermore, the main memory 110 stores position information of each moving picture displayed by the multi-window system and corresponding channel information of the audio selector 102.

FIG. 2 illustrates a window information table 400 showing the relationship between a position of a window, an image information supplier, and a channel of the audio selector, which are stored in the main memory 110. FIG. 2 shows that a moving picture from the image reproduction apparatus 1 is displayed in the window of the area A, and a moving picture from the image reproduction apparatus 2 is displayed in the window of the area B. Furthermore, the channel of the audio selector 102 to which the audio signal corresponding to each moving picture is input is indicated. It should be noted that the position information of the area A includes, for example, coordinate data indicating a frame position of the window. Each position information of the areas A, B, C corresponds to the display position of each moving picture which is screen-synthesized by the moving-picture synthesizer 106. When area where the pointer is located is detected, the image reproduction apparatus 101 displays the moving picture in the area indicated by the pointer and the corresponding channel of the audio selector 102 can be obtained.

Figure 3:
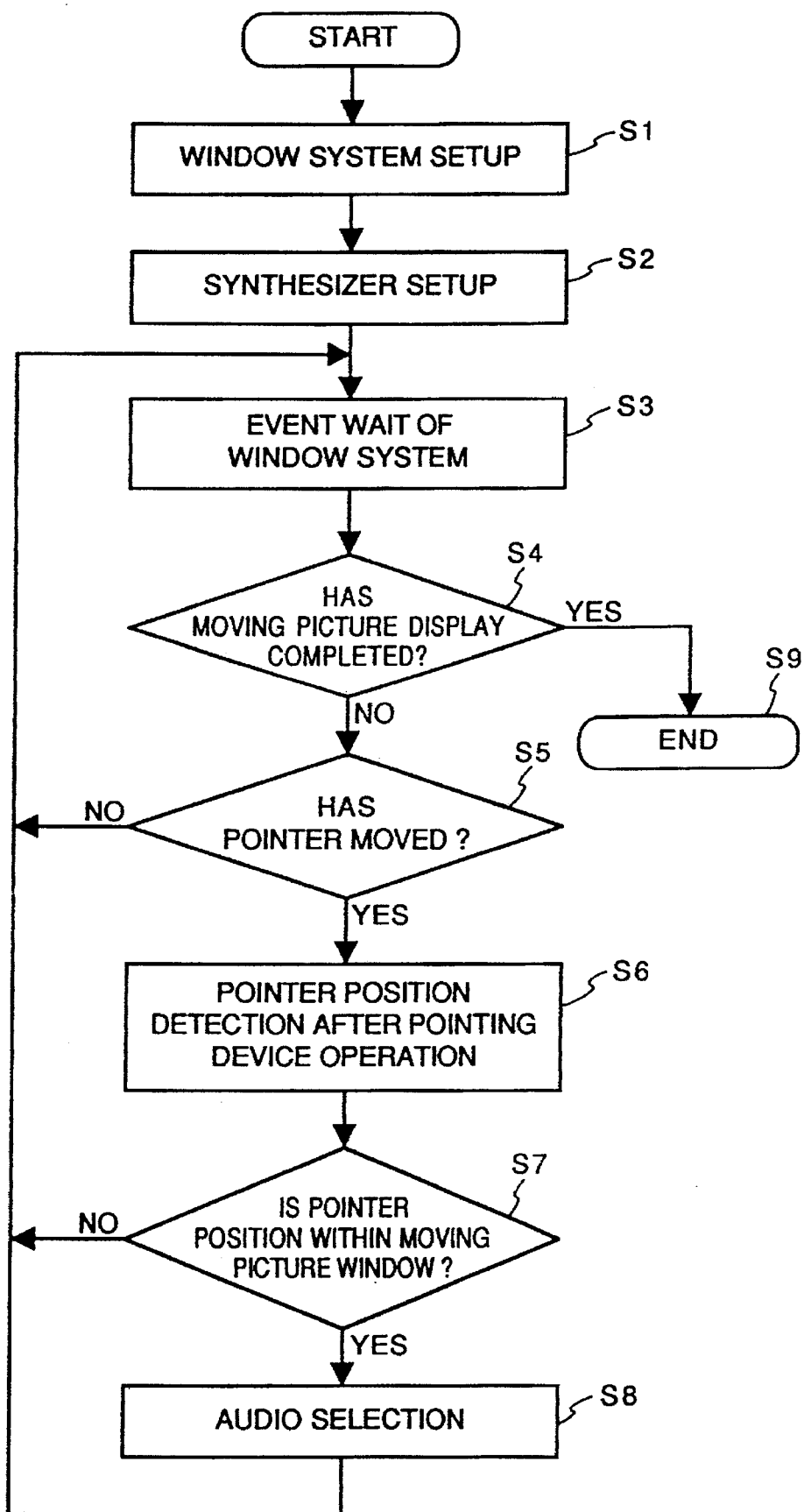
FIG. 3 is a flowchart illustrating a procedure for an audio selection processing in the audio output apparatus according to the first and second embodiments.

FIG. 3 is a flowchart illustrating a basic operation of the audio selection program. The program illustrated by this flowchart is stored in the main memory 110.

First, at steps S1 and S2, a moving-picture display start processing is performed. In this processing, a window system of the computer and moving-picture synthesizer are respectively set up at step S1 and step S2. Accordingly, the image signal from each image reproduction apparatus 101 is displayed in the areas A, B, C as shown in FIG. 2.

After this, the process proceeds to step S3 where the program enters a wait event loop. If an event has occurred and it is an event of pointer movement in response to an operation of the pointing device, the process proceeds from step S5 to S6 where the location of the pointer is detected. At step S7, it is judged whether or not the pointer is located within the moving-picture display windows. It can be checked if the pointer is located in one of the areas A, B, C of the window information table 400. If the pointer is located in one of the moving-picture display windows the process proceeds to step S8 where the channel of the audio selector corresponding to the moving picture indicated by the pointer is obtained. If the pointer is located in the area A, the channel "1" of the audio selector is selected from the window information table 400. The CPU 103 controls the audio selector 102 by the selected channel information and selects the sound corresponding to the designated moving picture. The above-described processing is repeated until the event of a moving-picture display completion occurs. When this occurs, the process proceeds from step S4 to S9 where the audio selecting program is ended.

As described above, according to the audio output apparatus of the present embodiment, when the pointer on the display screen is operated by the pointing device 105 and a moving picture is designated by the pointer, an audio output corresponding to the moving picture can be automatically obtained.

THE SECOND EMBODIMENT

Figure 4:
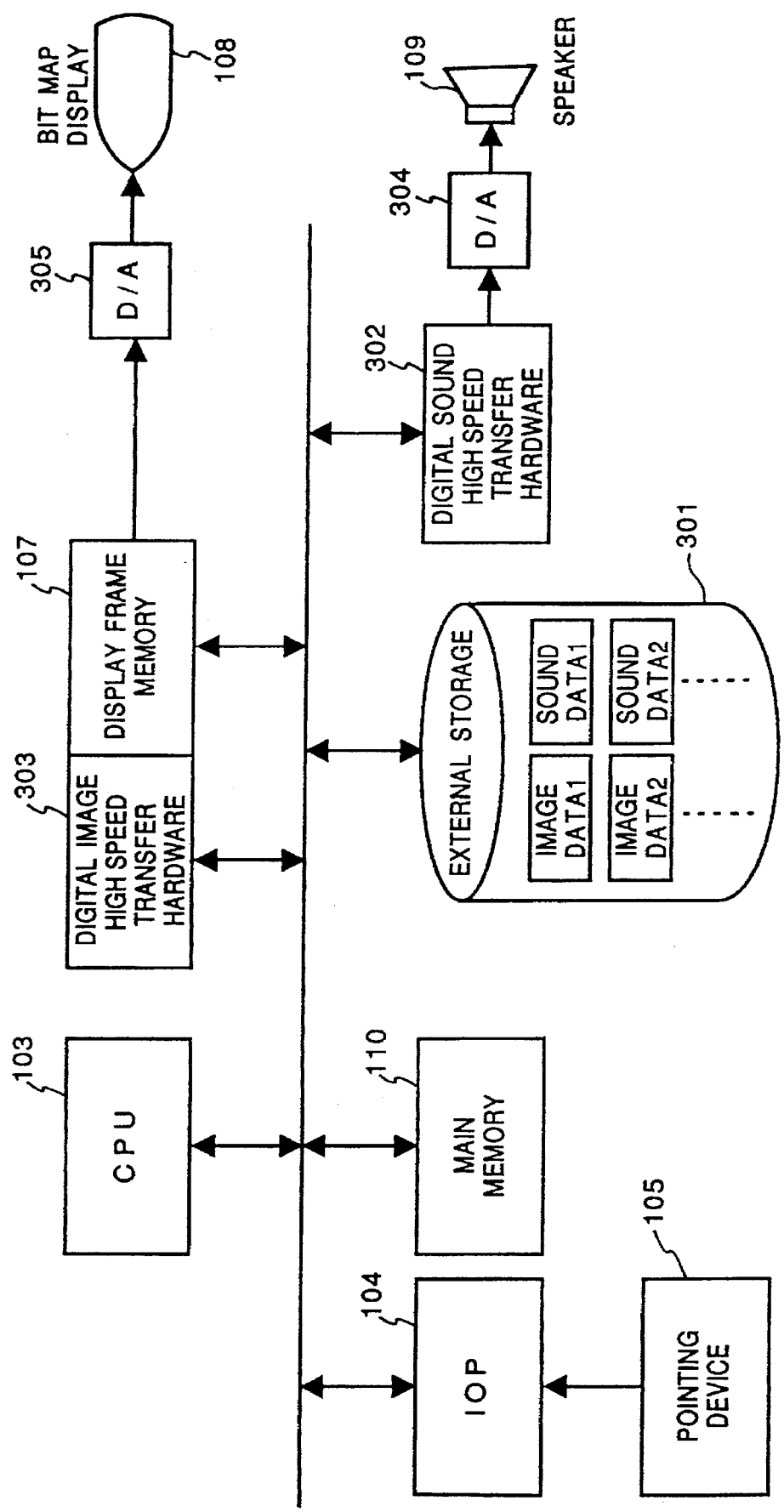
FIG. 4 is a block diagram illustrating a construction for controlling the multi-window system according to the second embodiment.

FIG. 4 is a block diagram illustrating the construction for controlling the multi-window system in the second embodiment. In FIG. 4, portions identical with those of the first embodiment are designated by like reference names/numerals and need not be described again. Numeral 301 is an external storage unit comprising a magnetic disk or magneto-optic disk which stores image data and audio data. Numeral 303 is a digital image high speed transfer hardware unit which transfers a plurality of image data stored in the external storage 301 to the display frame memory 107 and synthesizes a screen. The screen-synthesized image data is output as an image signal to the bit map display 108 via a D/A converter 305 and an image is reproduced. Numeral 302 is a digital sound high speed transfer hardware unit which reads out audio data from a plurality of audio data which are stored in the external storage 301 and reproduces the sound by the speaker 109 through a D/A converter 304. Then, the CPU 103 supplies the information of the sound data to be read out to the digital sound high speed transfer hardware 302 so that it selects an output sound from the external storage 301.

The main memory 110 stores a window information table as shown in FIG. 5. The window information table 410 stores window position information, an image data information which specifies image data to be displayed on a window, and a sound data information which specifies sound data to corresponding image data.

The main memory 110 stores a program executing the procedure of the audio selection processing which is a similar to that of the first embodiment. Designation of audio data to be output with respect to the digital sound high speed transfer hardware is executed by the CPU 103.

Judgement for selecting a sound is performed by the window information table 410 in the same manner as that of the first embodiment. That is, the CPU 103 detects a designated moving picture by detecting the location of the pointer on the bit map display 108, which is operated by the pointing device 105. Subsequently, the sound data corresponding to the image data of the designated moving picture is recognized with reference to the window information table 410. Then, the CPU 103 supplies the information of the sound data to be read out to the digital sound high speed transfer hardware 302 so that it selects an output sound from the external storage 301.

As described above, it is provided that the sound corresponding to a designated moving picture is selectively listened to by designating the moving picture among the plurality of moving pictures on the display by the pointer operation of the pointing device 105.

Though a pointer which is operated by the pointing device is illustrated as an example of a designation means of the present invention in the above embodiments, this does not impose a limitation upon the invention. The present invention is applicable to a touch panel, light-pen and visual point sensor (a spectacles type sensor which detects one's eyes) for designating a moving-picture display window. Furthermore, a moving picture can be designated in a manner such that each moving-picture display window is numbered and a number can be input from a key board or the like.

The present invention can be applied to a system constituted by a plurality of devices, or to an apparatus comprising a single device. Furthermore, it goes without saying that the invention is applicable also to a case where the object of the invention is attained by supplying a program to a system or apparatus.

According to the audio output method and apparatus of the present invention, a necessary audio output can be obtained in a manner such that only the sound corresponding to a designated moving picture selected from the plurality of moving picture display windows can be obtained.

As many apparently widely different embodiments of the present invention can be made without departing from the spirit and scope thereof, it is to be understood that the invention is not limited to the specific embodiments thereof except as defined in the appended claims.

What is claimed is:

1. An audio output apparatus in a multi-window system comprising:
   input means for inputting simultaneously a plurality of image information and a plurality of audio information wherein each of the audio information corresponds to each of the image information;
   display means for displaying simultaneously a plurality of images based on the plurality of image information input by said input means in different windows respectively on a display screen;
   designation means for designating one of the windows on the display screen; and
   audio output means for, while the plurality of images are being displayed on the display screen, selecting audio information corresponding to the image information of the window which is designated by said designation means out of the plurality of audio information which are input by said input means and outputting audio based on the selected audio information.

2. The audio output apparatus according to claim 1, wherein said input means inputs image information and audio information which are received from external image and audio reproduction apparatuses.

3. The audio output apparatus according to claim 1, wherein said plurality of images displayed by said display means are a plurality of moving pictures; and said designation means detects position information indicated by a pointing device and designates a moving picture out of the plurality of moving pictures which are displayed on the windows in accordance with said position information.

4. The audio output apparatus according to claim 1, wherein said plurality of images displayed by said display means are a plurality of moving pictures; said windows include identification information identifying each window; and said designation means designates one of the plurality of moving pictures which are displayed on the windows by inputting the identification information.

5. The audio output apparatus according to claim 1 further comprising registration means for registering each window and selection information to select the audio information of the image to be displayed in the window in pairs,
   said audio output means obtains selection information corresponding to the window designated by said designation means from said registration means, and outputs the audio information selected in accordance with the selection information.

6. An audio output apparatus in a multi-window system, comprising:
   storage means for storing a plurality of image information and a plurality of audio information wherein each of the audio information corresponds to each of the image information;
   display means for reading the plurality of image information stored in said storage means and displaying simultaneously a plurality of images based on the plurality of image information in different windows respectively on a display screen;
   designation means for designating a window; and
   audio output means for, while the plurality of images are being displayed on the display screen, reading audio information corresponding to the image information of the window designated by said designation means out of said storage means and outputting audio based on the read audio information.

7. The audio output apparatus according to claim 6, wherein said storage means stores moving-picture information to be displayed on each window and digitized audio information corresponding to the moving picture information.

8. An audio output method in a multi-window system comprising the steps of:
   inputting simultaneously a plurality of image information and a plurality of audio information wherein each of the audio information corresponds to each of the image information;
   displaying simultaneously a plurality of images based on the plurality of image information input by said input step in different windows respectively on a display screen;
   designating one of the windows on the display screen; and
   selecting audio information corresponding to the image information of the window which is designated by said designation step out of the plurality of audio information which are input by said input step and outputting audio based on the selected audio information, while the plurality of images are being displayed on the display screen.

9. The audio output method according to claim 8, wherein said input step inputs image information and audio information which are received from external image and audio reproduction apparatuses.

10. The audio output method according to claim 8, wherein said plurality of images displayed in said displaying step are a plurality of moving pictures; and said designation step detects position information indicated by a pointing device and designates a moving picture out of the plurality of moving pictures which are displayed on the windows in accordance with said position information.

11. The audio output method according to claim 8, wherein said plurality of images displayed in said displaying step are a plurality of moving pictures; said windows include identification information identifying each window; and said designation step designates one of the plurality of moving pictures which are displayed on the windows by inputting the identification information.

12. The audio output method according to claim 8 further comprising a registration method for registering each window and selection information to select the audio information of the image to be displayed in the window in pairs, said audio output step obtaining selection information corresponding to window designated by said designation step from said registration step, and outputs the audio information selected in accordance with the selection information.

13. An audio output method in a multi-window system, comprising the steps of:

storing a plurality of image information and a plurality of audio information wherein each of the audio information corresponds to each of the image information;

reading the plurality of image information stored in said storage step and displaying simultaneously a plurality of images based on the plurality of image information in different windows respectively on a display screen;

designating a window; and reading audio information corresponding to the image information of the window designated by said designation step out of said storage step and outputting audio based on the read audio information, while the plurality of images are being displayed on the display screen.

14. The audio output method according to claim 13, wherein said storage step stores moving-picture information to be displayed on each window and digitized audio information corresponding to the moving picture information.

\* \* \* \* \*

UNITED STATES PATENT AND TRADEMARK OFFICE
CERTIFICATE OF CORRECTION

PATENT NO. : 5,666,555
DATED : September 9, 1997
INVENTOR(S) : Okazaki et al.

It is certified that error appears in the above-indentified patent and that said Letters Patent is hereby corrected as shown below:

<u>COLUMN 4</u>:

Line 42, delete "a".

Signed and Sealed this

Twenty-fourth Day of March, 1998

Attest:

BRUCE LEHMAN

*Attesting Officer*     *Commissioner of Patents and Trademarks*